United States Patent [19]

Tokita

[11] Patent Number: 4,774,531

[45] Date of Patent: Sep. 27, 1988

[54] RECORDING APPARATUS

[75] Inventor: Muneo Tokita, Yokohama, Japan

[73] Assignee: Kabushiki Kaisha Toshiba, Kawasaki, Japan

[21] Appl. No.: 135,273

[22] Filed: Dec. 21, 1987

[30] Foreign Application Priority Data

Dec. 22, 1986 [JP] Japan ................................ 61-305672

[51] Int. Cl.[4] ............................................ G01D 15/00

[52] U.S. Cl. .................................... 346/145; 346/160

[58] Field of Search ................... 346/160, 107 R, 108, 346/145; 355/8, 3 RR; 400/410, 171, 172, 175, 691, 692, 693, 694

[56] References Cited

U.S. PATENT DOCUMENTS 4,420,762 12/1983 Andrews ............................ 346/145

4,562,444 12/1985 Nagashima et al. ............... 346/145

*Primary Examiner*—Arthur G. Evans

*Attorney, Agent, or Firm*—Foley & Lardner, Schwartz, Jeffery, Schwaab, Mack, Blumenthal & Evans

[57] ABSTRACT

A recording apparatus such as a laser printer includes a housing in which are arranged units such as a photosensitive drum and an exposure unit. An opening is formed in a bottom portion of the housing. The exposure unit scans the pre-charged photosensitive drum with a laser beam to form an electrostatic latent image on the photosensitive drum. Pins are located in the housing. Grooves are formed in the exposure unit so as to be fitted onto the pins. The exposure unit is provided in the housing, and can be detached from the housing moved through the opening, with the pins fitted in the grooves. As a result, the exposure unit can be attached to and detached from the housing without other units having to be detached beforehand.

7 Claims, 4 Drawing Sheets

RECORDING APPARATUS

BACKGROUND OF THE INVENTION

The present invention relates to a recording apparatus such as a laser printer.

A laser printer includes an exposure unit. A laser beam is generated by the exposure unit and is scanned on a pre-charged photosensitive drum, whereby an electrostatic latent image is formed thereon. The electrostatic latent image is developed by toner supplied from a developing unit, thereby resulting in a toner image being formed on the photosensitive drum. A transfer charger then transfers the toner image onto paper fed between itself and the photosensitive drum. Thereafter, the transferred toner image is fixed on the paper by a fixing unit.

The exposure unit is detachably arranged in a housing so as to facilitate maintenance and inspection.

If the exposure unit is set in an upper portion of the housing, it can be attached to and detached from the upper side or a side portion of the housing.

In a recently developed printer, a paper convey path and units such as a fixing unit and the like are arranged above the photosensitive drum. As a result of this arrangement, paper which becomes jammed inside the printer, can be easily removed from the housing through the opening made in the upper side thereof.

However, the exposure unit of this printer must be arranged in a lower and middle portion of the housing, with the result that if the exposure unit is arranged in a LOWER and middle portion of the houding, it cannot therefore be in the UPPER portion or close to any side of the housing. Therefore it cannot be detached from the upper side or from any side, without detaching the units such as the fixing unit, thereby posing a problem of poor operability.

SUMMARY OF THE INVENTION

It is an object of the present invention to provide a recording apparatus, in which a light radiating means can be detached without detaching other units even if the light radiating means is arranged in a bottom portion of a housing so as to improve operability.

According to an aspect of the present invention, there is provided a recording apparatus which comprises a housing having an opening in a bottom portion thereof, a recording medium arranged in the housing, light radiating means for recording data on the recording medium by irradiating the recording medium with light, and support means for supporting the light radiating means in the housing in such a manner that the light radiating means can be attached and detached through the opening.

DETAILED DESCRIPTION OF THE PREFERRED EMBODIMENT

An embodiment of the present invention will now be described below, with reference to the accompanying drawings.

Figure 1:
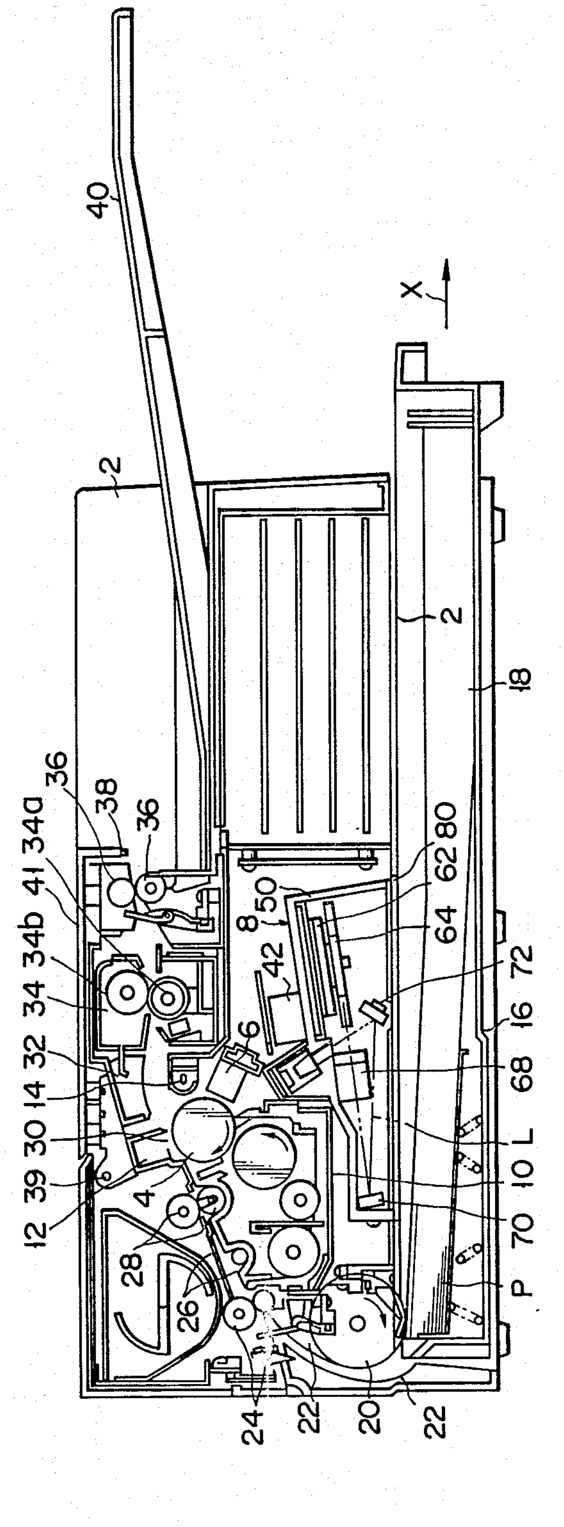
FIG. 1 is a schematic view of a laser printer as a recording apparatus according to the present invention.

Referring to FIG. 1, reference numeral 2 denotes a housing. Photosensitive drum (recording medium) 4 is arranged in housing 2 and rotates in the direction indicated by the arrow. Charger 6, exposure unit (recording means) 8, developing unit 10, transfer charger 12, and discharger 14 are arranged around photosensitive drum 4, in the order given, along its rotational direction. After charger 6 charges evenly the surface of photosensitive drum 4, the charged surface is exposed by exposure unit 8, thereby to form an electrostatic latent image thereon. Developing unit 10 develops the electrostatic latent image into a toner image by applying toner onto drum 4. Thereafter, transfer charger 12 transfers the toner image onto paper P, and discharger 14 removes the residual charge on drum 4.

Cassette mounting frame 16 is coupled to a lower portion of housing 2. Paper feed cassette 18 is detachably set in frame 16. Paper P stored in cassette 18 is picked up one by one by pickup roller 20. Picked-up paper P is guided toward a pair of aligning rollers 24 by a pair of guides 22. Paper P is aligned by aligning rollers 24. Paper P is guided toward a pair of feed rollers 28 by a pair of guides 26, and then conveyed to transfer position 30 located above photosensitive drum 4. Transfer charger 12 and guide 32 oppose transfer position 30. Thereafter, paper P is conveyed to discharge tray 40 through fixing unit 34, a pair of discharge rollers 36, and discharge brush 38. Fixing unit 34 includes heat roller **34*a* and press roller 34*b*. Transfer charger 12, guide 32, upper discharge roller 36, and the like are fixed to a door, which is pivotally supported by shaft 39. With the above arrangement, if paper P is jammed in a convey path from transfer position 30 to discharge tray 40, it can be easily removed from the path by only opening door 41**.

In the recording operation, the surface of photosensitive drum 4 is evenly charged by charger 6. The charged surface of photosensitive drum 4 is exposed by exposure unit 8 to form an electrostatic latent image. Toner is applied onto the electrostatic latent image by developing unit 10. Thus, a toner image is formed on photosensitive drum 4.

Paper P is picked up from paper feed cassette 18 by pickup roller 20. Paper P is conveyed to transfer position 30 through guides 22, aligning rollers 24, guides 26, and feed rollers 28. The toner image on photosensitive drum 4 is transferred onto paper P by transfer charger 12 at transfer position 30. Then, paper P is conveyed to fixing unit 34 through guide 32. Fixing unit 34 fixes the toner image on paper P. Thereafter, paper P is discharged onto discharge tray 40 by discharge rollers 36.

Figure 2:
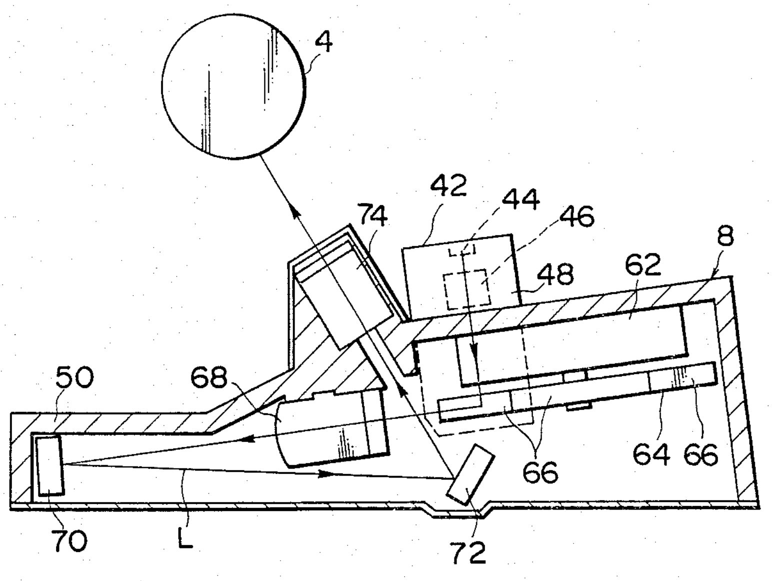
FIG. 2 is a sectional view of an exposure unit used in the printer in FIG. 1.
Figure 3:
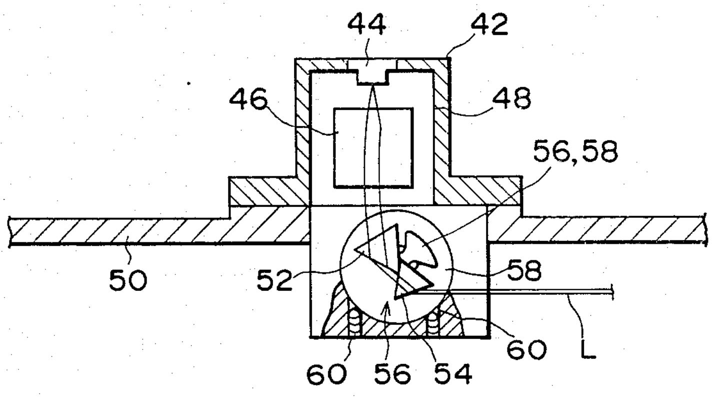
FIG. 3 is a sectional view of a laser unit and a beam shaper used in the exposure unit in FIG. 2.

As shown in FIG. 2, exposure unit 8 includes laser unit 42. Laser unit 42 includes semiconductor laser 44 for generating laser beam L in accordance with information supplied from an information supply unit (not shown), and collimating lens 46 for collimating divergent laser beam L generated by semiconductor laser 44. As shown in FIG. 3, semiconductor laser 44 and collimating lens 46 are integrally supported on an upper surface portion of case 50 of exposure unit 8 by support member 48. Laser beam L collimated by collimating lens 46 is shaped by beam shaper 56 having two prisms 52 and 54 so as to obtain a desired spot size on photosensitive drum 4. Prisms 52 and 54 are supported on the upper portion of case 50 of exposure unit 8 by support members 56 and 58, and screws 60.

As shown in FIG. 2, polygonal mirror 64 to be rotated by drive motor 62 is arranged in exposure unit 8. Polygonal mirror 64 has a plurality of reflecting surfaces 66 on its circumferential surface. Laser beam L shaped by beam shaper 56 is deflected by polygonal mirror 64. Deflected laser beam L is guided onto photosensitive drum 4 through first lens 68, first and second mirrors 70 and 72, and second lens 74, and scanned along the axial direction of photosensitive drum 4.

Figure 4:
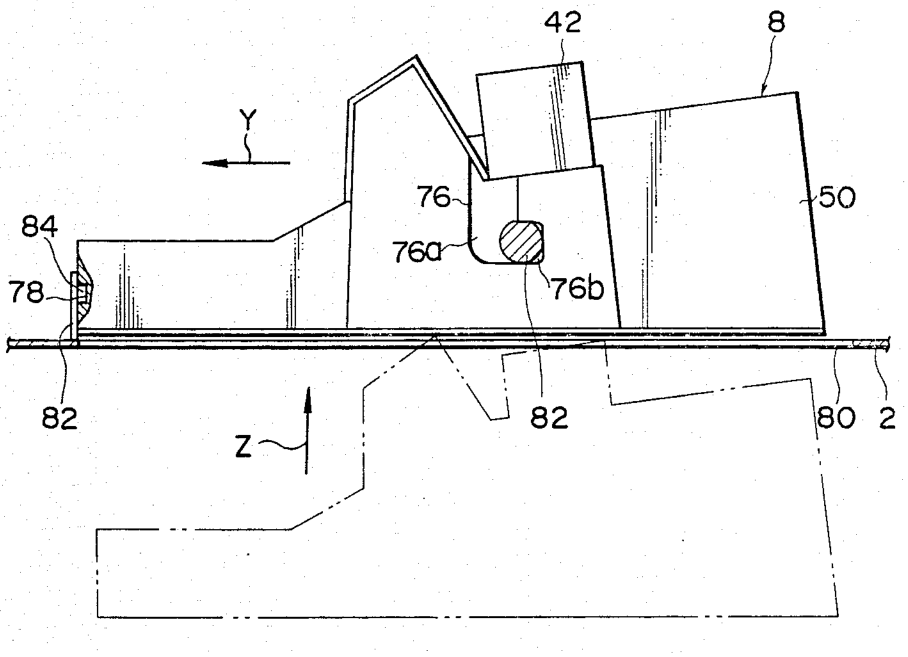
FIG. 4 is a side view of part of a housing and the exposure unit used in the printer in FIG. 1.
Figure 5:
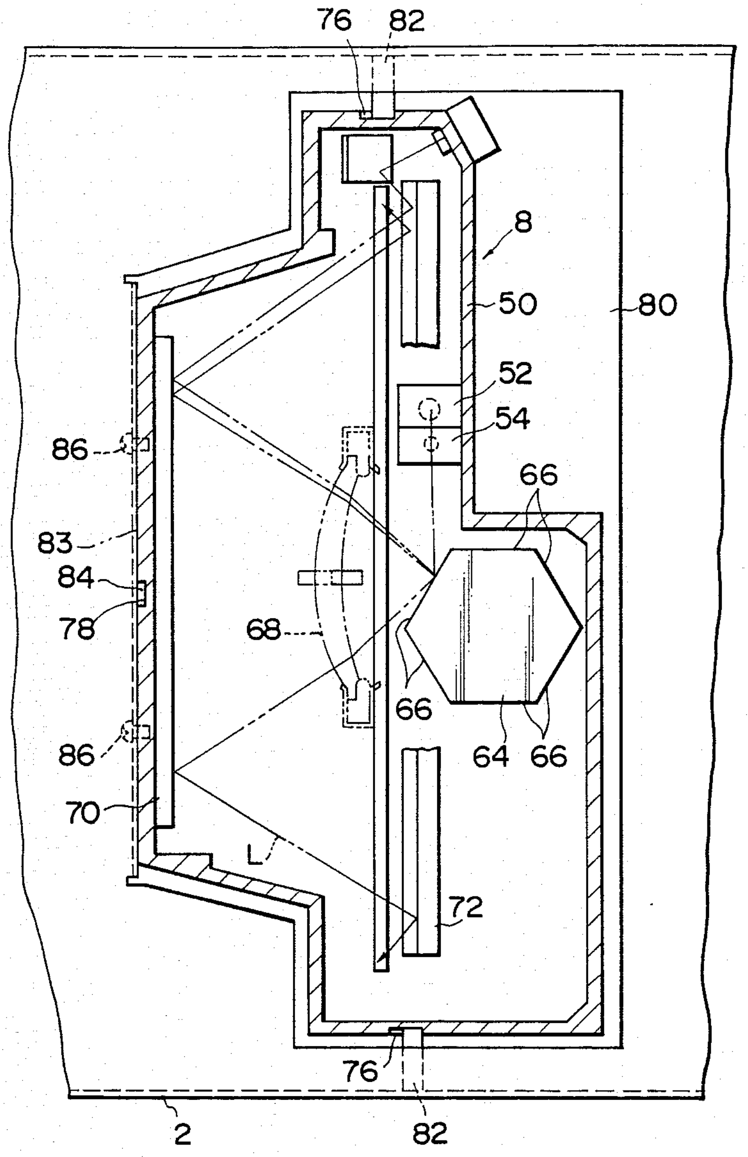
FIG. 5 is a sectional view of the part of the housing and the exposure unit when viewed from the bottom.

As shown in FIGS. 4 and 5, L-shaped grooves 76 are formed in front and rear side surfaces of case 50 of exposure unit 8. Each groove 76 is constituted by first, vertical groove portion 76*a* and second, horizontal groove portion 76*b* communicating with first groove portion 76*a*. Recess 78 is formed in the left side portion of case 50 in FIG. 4. Opening 80 is formed in the bottom surface of housing 2 so as to attach and detach exposure unit 8. Pins 82 extend from front and rear inner surfaces of housing 2 so as to be fitted in grooves 76. Support plate 82 is formed on a left edge portion of opening 80 of housing 2 in FIG. 4 so as to extend into housing 2. Projection 84 is formed on support plate 83 to be fitted in recess 78 of exposure unit 8.

When exposure unit 8 is to be set in housing 2, paper feed cassette 18 is moved in a direction indicated by X in FIG. 1, and is detached from frame 16. Then, exposure unit 8 is, from the position indicated by the two-dot chain line in FIG. 4, moved upward such that first groove portions 76*a* of exposure unit 8 oppose pins 82. Exposure unit 8 is then further moved in direction Z (FIG. 4) until it is inserted into housing 2 through opening 80. Thereafter, first groove portions 76*a* are fitted onto pins 82. Exposure unit 8 is moved upward to such an extent that pins 82 are positioned at the lower end portions of first groove portions 76*a*. When exposure unit 8 is moved in a direction indicated by arrow Y in FIG. 4, pins 82 are fitted in second groove portions 76*b*. Upon this operation, vertical movement of exposure unit 8 is restricted. When exposure unit 8 is moved to such an extent that recess 78 of exposure unit 8 is fitted onto projection 84 formed on support plate 83, positioning of exposure unit 8 with respect to photosensitive drum 4 is finished. Upon positioning, exposure unit 8 is fixed to support plate 82 of housing 2 by screws 86.

When exposure unit 8 is to be detached from housing 2, the above steps are reversed.

In the above embodiment, grooves 76 and recess 78 are formed in exposure unit 9, while pins 82 and projection 84 are formed on housing 2. However, grooves 76 and recess 78 may be formed in housing 2, while pins 82 and projection 84 may be formed on exposure unit 8. Furthermore, the structure of support means is not limited to the one constituted by grooves, pins, a recess, and a projection.

What is claimed is:

1. A recording apparatus comprising:
- a housing having an opening in a bottom portion thereof;
- a recording medium arranged in said housing;
- a recording means for recording data on said recording medium; and
- support means for supporting said recording means in said housing, in such a manner that said recording means can be attached to and detached from said housing through the opening.

2. The apparatus according to claim 1, wherein said support means comprises positioning means for positioning said light radiating means.

3. The apparatus according to claim 2, wherein said positioning means comprises a first engaging portion fixedly provided in said housing, and a second engaging portion formed in said recording means and adapted to be fitted onto said first engaging portion.

4. The apparatus according to claim 3, wherein one of said first and second engaging portions has a recess and the other has a projection to be fitted in said recess.

5. The apparatus according to claim 4, wherein said recess includes an L-shaped groove to be engaged with said projection.

6. The apparatus according to claim 5, wherein said groove comprises a first groove portion for guiding said projection in the direction of moving said recording means through said opening, and a second groove portion communicating with said first groove portion and guiding said projection in a direction different from said first groove portion, so as to limit movement of said light radiating means in an attaching/detaching direction.

7. The apparatus according to claim 1, wherein said recording means comprises a light radiating means for irradiating said recording means.

* * * * *